United States Patent [19]

Park

[11] Patent Number: 5,664,045
[45] Date of Patent: Sep. 2, 1997

[54] VIDEO SIGNAL PROCESSOR FOR COMPENSATING SKEW AND ELIMINATING NOISE

[75] Inventor: Hyun-Jeong Park, Suwon, Rep. of Korea

[73] Assignee: Samsung Electronics Co., Ltd., Kyungki-do, Rep. of Korea

[21] Appl. No.: 581,196

[22] Filed: Dec. 29, 1995

[30] Foreign Application Priority Data

Apr. 27, 1995 [KR] Rep. of Korea ............... 10178/1995

[51] Int. Cl.$^6$ .................. H04N 5/911; H04N 5/91; H04N 5/21
[52] U.S. Cl. .................. 386/114; 386/76; 348/607
[58] Field of Search .................. 386/25, 47, 49, 386/76, 114, 115, 85, 13; 348/683, 606, 607, 533, 470, 241, 620; H04N 5/911, 5/91, 5/21

[56] References Cited

U.S. PATENT DOCUMENTS

| 4,841,366 | 6/1989 | Katagiri et al. | 386/114 |
| 4,858,030 | 8/1989 | Oku et al. | 386/76 |
| 4,939,593 | 7/1990 | Yuuchi et al. | 386/76 |
| 5,089,916 | 2/1992 | Kluth | 386/114 |
| 5,331,415 | 7/1994 | Hamasaki et al. | 386/114 |

*Primary Examiner*—Robert Chevalier
*Attorney, Agent, or Firm*—Sughrue, Mion, Zinn, Macpeak & Seas

[57] ABSTRACT

A video signal processor for compensating for skew and eliminating noise operable during a high speed search mode of operation includes a synchronizing signal generator receiving a clock and generating a pseudo horizontal sync signal, a controller, initialized in a first logic state of a horizontal synchronizing signal, for counting the period of a second logic state in the horizontal synchronizing signal with reference to the clock for generating a compensated composite synchronizing signal when a counted value exceeds a predetermined value and for generating a compensation control signal having a duration of one horizontal period, line memories and field memories for storing and delaying input video data in terms of line and field units, respectively, for output, a video data compensator for supplying the output of the line memories to the field memories in a first operating mode and feeding back the output of the line memories in a second operating mode responsive to the compensation control signal, and a video signal generator for converting the video data output from the field memories into analog video signal and providing the analog video signal in synchronization with the generated pseudo horizontal synchronizing signal. Therefore, in searching a video signal reproduced from a magnetic recording medium of a video recording/playback system, the skew due to a lost synchronizing signal can be prevented, thereby eliminating that cause of deterioration in picture quality.

6 Claims, 3 Drawing Sheets

VIDEO SIGNAL PROCESSOR FOR COMPENSATING SKEW AND ELIMINATING NOISE

BACKGROUND OF THE INVENTION

1. Field of the Invention

The present invention relates to a video signal processor used in a video signal playback system and, more particularly, to a circuit for processing a video signal digitally in order to compensate skew generated during high-speed playback of the video signal recorded onto a recording medium.

The instant application is based on Korean Patent Application No. 10178/1995, which is incorporated herein by reference for all purposes.

2. Discussion of Related Art

Currently, the most widely used video signal playback systems reproduce a video signal by recovering the video signal recorded onto a recording medium such as a magnetic recording tape (tape hereinafter). In general, the video signal recorded on the tape is recovered using from a magnetic head and then reproduced.

A general video signal processing system processes an analog video signal recovered from a head by analog processing, i.e., without change, or processes the video signal digitally in order to add separate functions, such functions often being referred to as trick play functions. For example, many video signal playback systems have a search function for viewing the information recorded on the tape at high speed.

In a video signal processing system for recording and reproducing a standard television video signal, when searching the analog video signal recorded onto the magnetic tape, the video signal of odd-occurring fields and the video signal of even-occurring fields, which field signals are recorded onto the magnetic recording tape while a rotary magnetic head rotates, are switched and scanned during reproduction. It will be appreciated that the standard television video signal includes sync signals that differ from each other by about 0.5 H, where H represents a horizontal period, in their synchronizing signals of even-occurring fields and odd-occurring fields. Skew develops if the video signal having different syncs is reproduced on a screen as it is without correction or compensation. Therefore, a conventional video signal playback system has a separate correction circuit for correcting the skew of 0.5 H in switching the field from even-occurring one to odd-occurring one. It will also be noted that during search operation, the noise generated due to lost synchronizing signals cannot be eliminated but is output as it is without noise compensation.

The present invention was motivated by a desire to avoid the problems associated with digital signal processing during a high speed search mode of operation.

SUMMARY OF THE INVENTION

Therefore, it is an object of the present invention to provide a circuit which compensates for skew by automatically compensating for a lost synchronizing signal.

Another object of the present invention is to provide a circuit for eliminating noise associated with loss of the synchronizing signal in video signals recovered from a magnetic tape during a search mode of operation.

Yet another object of the present invention is to provide a digital searching circuit which can reproduce a high quality picture by digitally processing an analog video signal recorded onto a magnetic tape.

These and other objects, features and advantages according to the present invention are provided by a video signal processor for compensating for skew and eliminating noise. In an exemplary case, the video signal processor according to the present includes a synchronizing signal generator receiving a clock signal and generating a pseudo horizontal signal, a controller, initialized in a first logic state by a horizontal synchronizing signal, for counting the period of a second logic state in the horizontal synchronizing signal responsive to the clock signal to thereby generate a compensated horizontal synchronizing signal when the counted value is greater than a predetermined value or to output a compensation control signal having a duration of one horizontal period, line memories and field memories for storing and delaying input video data in line and field units, respectively, for output. Additionally, the video signal processor includes a video data compensator for supplying the output of the line memories as input source of the field memories and for feeding back the output of the line memories in response to the compensation control signal and a video signal encoder for converting the digital video data output from the field memories into an analog video signal and providing the analog video signal in synchronization with the generated pseudo horizontal synchronizing signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

Figure 1:
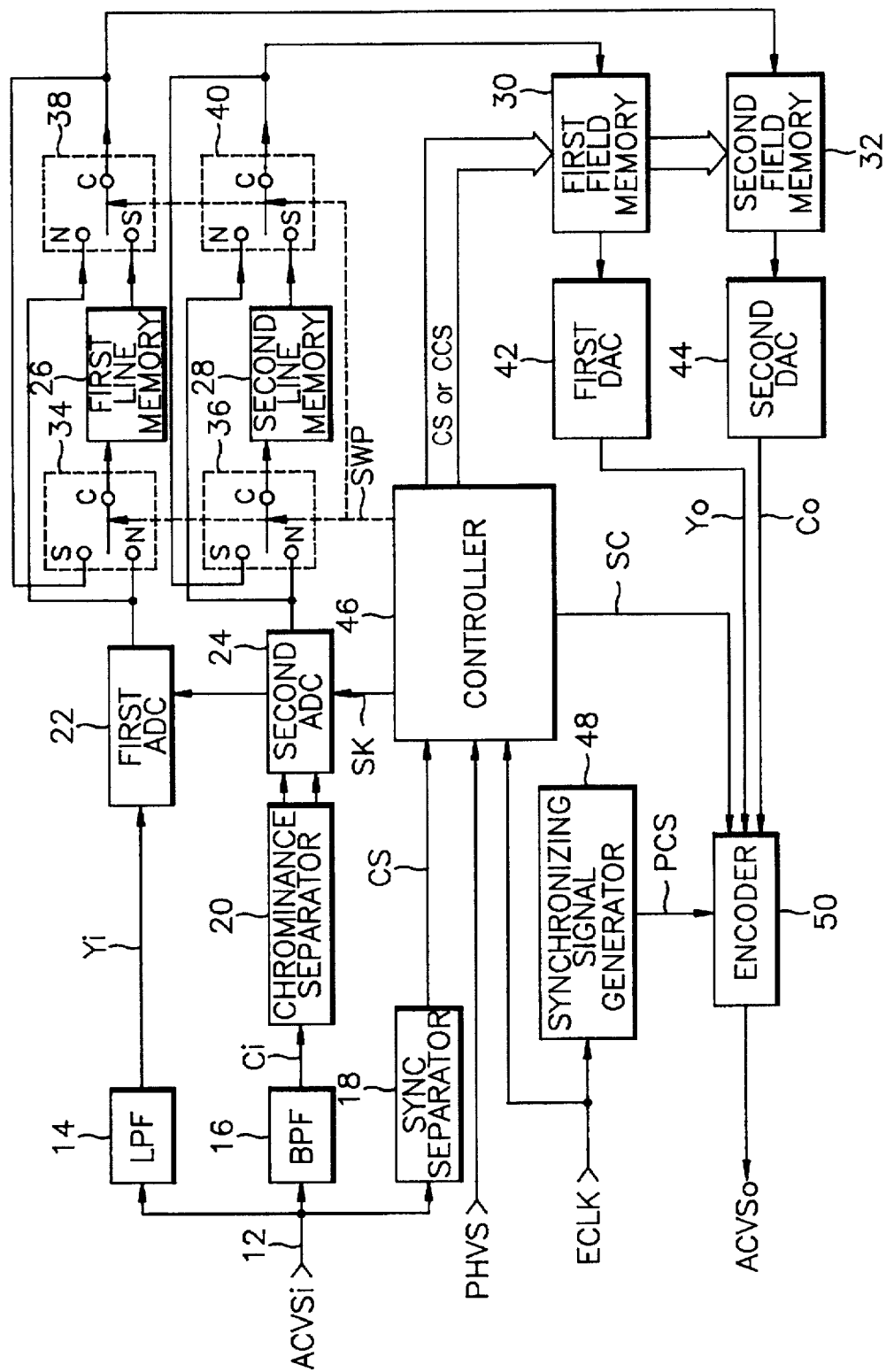
FIG. 1 is a block diagram of a video signal processor according to the present invention.

Referring to FIG. 1, an analog composite video signal ACVSi recovered from a magnetic tape via a rotary magnetic head (not shown) is supplied to a lowpass filter (LPF) 14, a bandpass filter (BPF) 16 and an input port of a sync separator 18, respectively. LPF 14 lowpass-filters the analog composite video signal ACVSi so as to separate and output only a luminance signal Yi. The separated luminance signal Yi is input to a first analog-to-digital Converter (ADC) 22 connected to the output port of LPF 14. BPF 16 bandpass-filters the analog composite video signal ACVSi so as to separate and output only a chrominance signal Ci. The separated chrominance signal Ci is input to a chrominance separator 20. In an exemplary case, LPF 14 and BPF 16 can be any of the filters widely used in the art for separating a chrominance signal or a luminance signal from a composite video signal.

Preferably, sync separator 18 separates the analog composite video signal ACVSi into a composite synchronizing signal CS and a video signal. The separated composite synchronizing signal CS is supplied to a controller 46, the functions of which are discussed in greater detail below.

First ADC 22, which is connected to the output port of LPF 14, converts the luminance signal Yi into a digital signal responsive to a sampling clock SK and thereafter supplies the converted digital signal to the normal port N of switches 34 and 38, respectively. Advantageously, chrominance separator 20 receives the separated chrominance signal Ci, generates color difference signals R-Y and B-Y and thereafter supplies them to a second ADC 24, which converts the color difference signals R-Y and B-Y into digital signals in response to the sampling clock SK. The digitally converted color difference signal advantageously is supplied to the normal port N of switches 36 and 40, respectively. In an exemplary and non-limiting case, the sampling clock SK is output from the controller 46, to be described later, at a frequency satisfying the Nyquist sampling theorem.

From the discussion thus far it will be appreciated that if the video signal processor operates in a search mode to reproduce the composite video signal ACVSi at a high-speed from the magnetic recording medium, the digital luminance signal is supplied to the normal port N of switches 34 and 38, and the digital chrominance signal is supplied to the normal port N of switches 36 and 40. At this time, switches 36 through 40 maintain the state wherein the signal received an a respective normal port N is provided to a common port C.

It will be appreciated from FIG. 1 that first and second line memories 26 and 28 respectively store a digital luminance signal and a digital chrominance signal in their internal storage region in line units so that the digital luminance signal and the digital chrominance signal are delayed in terms of line units for output. Advantageously, first and second field memories 30 and 32, which are connected to the common port C of switches 38 and 40, respectively, store the digital luminance signal and the digital chrominance signal in the internal storage region in field units so that the digital luminance signal and the and digital chrominance signal are delayed in terms of field units for output. The reading and writing operations of first and second field memories 30 and 32 are controlled by controller 46, which will become more apparent from the following explanation.

Controller 46, which is shown in FIG. 1, receives an externally generated pseudo vertical synchronizing signal PVS, an external clock ECLK having a predetermined frequency and a composite synchronizing signal CS separated and output by sync separator 18. Controller 46 supplies sampling clock SK, for converting an analog signal into a digital signal, to first and second ADC's 22 and 24 in response to the input of these signals, and outputs a subcarrier SC to an encoder 50. Preferably, controller 46 determines the presence or absence of errors in the composite synchronizing signal CS supplied from sync separator 18. A compensation control signal SWP corresponding to a determination result is supplied to the control port of switches 34 through 40.

Figure 2:
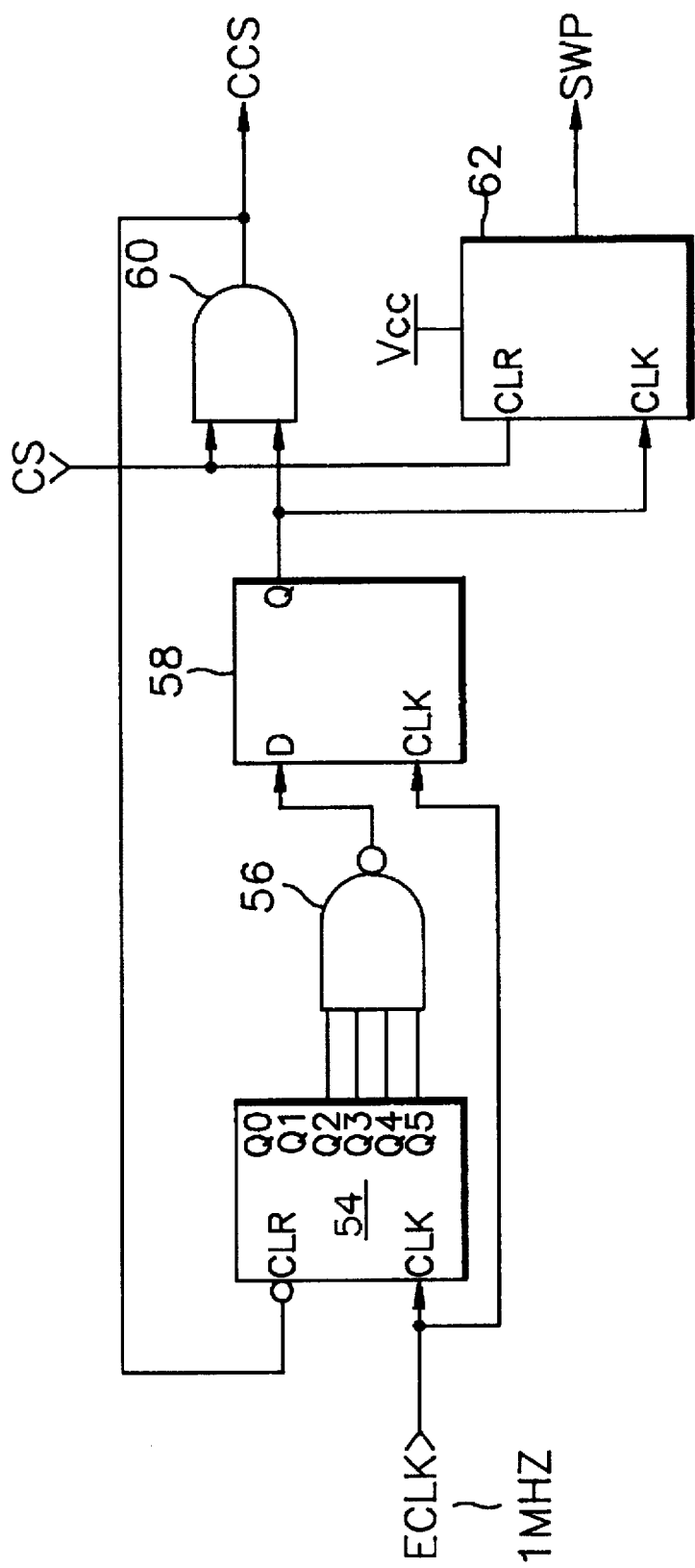
FIG. 2 is a detailed circuit diagram of a horizontal synchronizing signal determiner according to the present invention which finds use in the circuit depicted in FIG. 1.

Controller 46 preferably incorporates a horizontal synchronizing signal determiner for determining the presence or absence of errors in the composite synchronizing signal CS supplied from sync separator 18, which circuit is shown in FIG. 2 and is discussed in greater detail below while referring to FIGS. 3A–3F. It should be noted that in FIGS. 3A–3F, reference letter R represents a reset point, RR represents a reset release point, and EP represents an error point.

Figure 3:
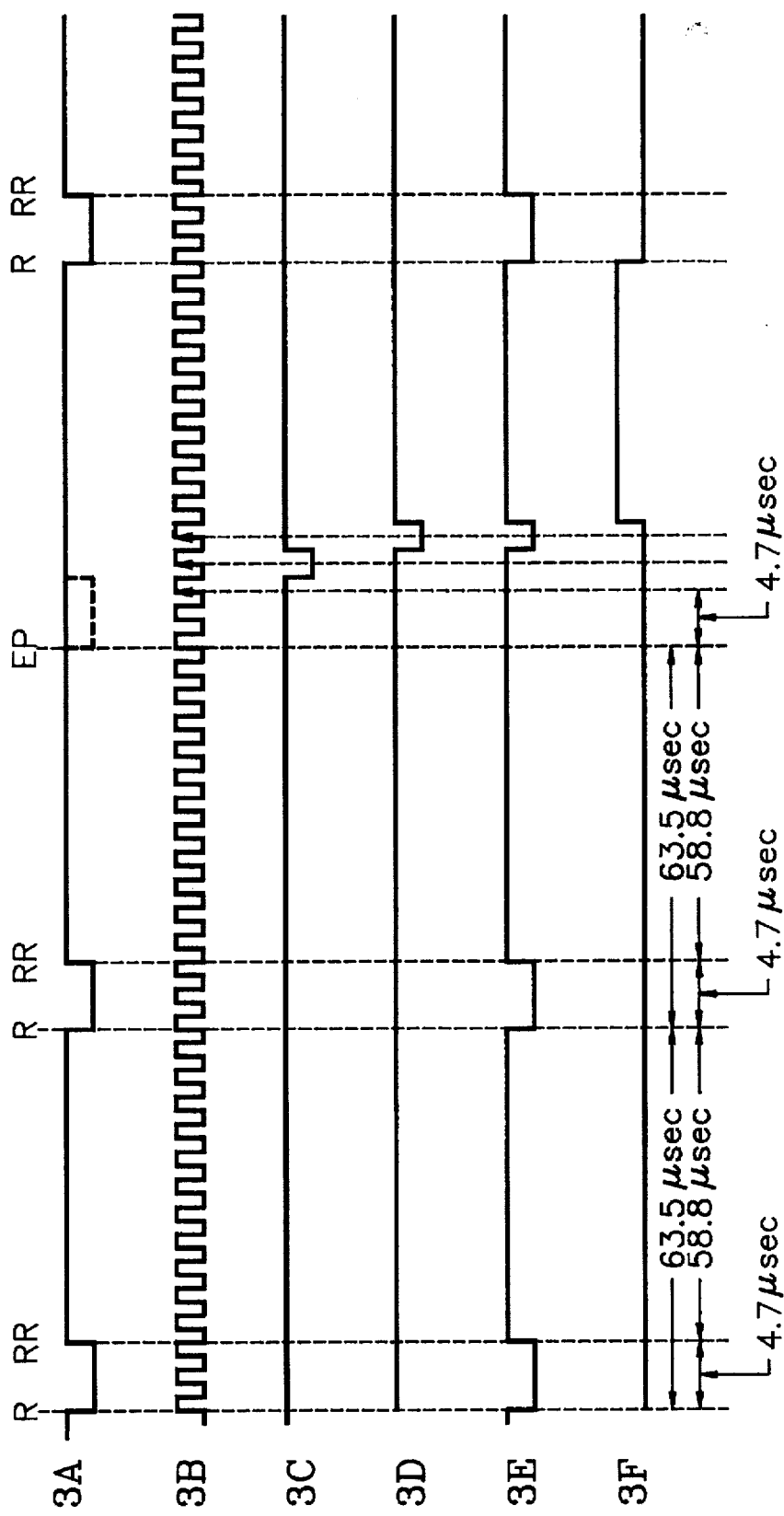
FIG. 3 are waveform diagrams which are helpful in explaining the operation of the horizontal synchronizing signal determiner according to the present invention.

When the composite synchronizing signal CS shown in FIG. 3A is supplied from sync separator 18, a counter 54 and a flip-flop 62 are each initialized in a first logic state responsive to the horizontal synchronizing signal CS, e. g., whenever the composite synchronizing signal CS is logic "low." When the state of the horizontal synchronizing signal is a second logic state, e.g., when the horizontal synchronizing signal CS becomes logic "high," the reset point is released.

A clear port CLR of counter 54, which receives the composite synchronizing signal CS at a first input port, is connected to the output port of an AND gate 60, which gate receives a sync error detection signal via its second input port. Thus, counter 54 is reset, i.e., initialized, during each horizontal blanking period of the respective horizontal synchronizing signal of the composite synchronizing signal CS and then counts the received external clocks ECLK during the following horizontal period. It should be noted that, assuming that counter 54 is a 6-bit binary counter and the external clock ECLK is about 500 kHz, when the composite synchronizing signal CS is normally generated from sync separator 18, the output ports Q2 through Q5 of counter 54 do not become logic "high," simultaneously. Therefore, if the composite synchronizing signal CS is received normally, a decoder 56 connected to output ports Q2 through Q5 of counter 54, e.g., NAND gate 56, always outputs a logic "high." From FIG. 2 it will be appreciated that the output of flip-flop 58, which delays the output of NAND gate 56, also maintains a logic "high" state. Accordingly, AND gate 60 gates the composite synchronizing signal CS output from sync separator 18, as it is, for output. Advantageously, flip-flop 62 maintains an initialized state, thereby becoming a logic "low" state as shown in FIG. 3F.

When the horizontal synchronizing signal component of the composite synchronizing signal CS output from sync separator 18 switches from a first logic state to a second logic state, if a horizontal synchronizing signal is not generated within one horizontal line (1 H) period, a reset operation is not executed, so that the outputs of output ports Q2 through Q5 of counter 54 all become logic "high." In other words, if a horizontal synchronizing signal component of composite synchronizing signal CS is not input within one horizontal period (about 63 μsec) (EP in FIG. 3A), "high" signals are all output from output ports Q2 through Q5 of counter 54. At this time, the output of NAND gate 56, which is connected to the output port of counter 54, becomes logic "low," as shown in FIG. 3C, and, thus, an error detection signal is generated.

The error detection signal generated by NAND gate 56, as shown in FIG. 3C, is delayed by a D-type flip-flop 58 for one period of the external clock ECLK, as shown in FIG. 3D, and is then supplied to the AND gate 60 and the clock port CLK of D-type flip-flop 62. Therefore, AND gate 60 performs an AND-operation with respect to the output of sync separator 18 and the output of flip-flop 58 and outputs a compensated composite synchronizing signal CCS, as shown in FIG. 3E. In other words, even if a horizontal synchronizing signal is not input precisely, due to either an external cause or the aforementioned causes, AND gate 60 generates a compensated composite synchronizing signal by performing the operations associated with the elements depicted in FIG. 2.

In FIG. 2, flip-flop 62 outputs the compensation control signal SWP by being turned into a logic "high" in response to a rising edge in its respective input signal, i.e., wherein the output of flip-flop 58 switches from logic "low" to logic "high," as shown in FIG. 3F. The "high state" of the compensation control signal SWP is maintained until the next horizontal synchronizing signal is normally input. It will be noted that the compensation control signal SWP is supplied as a switching control signal of switches 34 through 40, as shown in FIG. 1.

Switches 34 through 40, all of which receive the compensation control signal SWP output from controller 46, are switched from the normal port N to switching port S, i.e., from a first mode of operation to a second mode of operation, respectively, in response to the "high" state compensation control signal SWP.

Therefore, if the composite synchronizing signal is abnormally input due to the aforementioned cause, first and second field memories 30 and 32 input the digital luminance signal and the digital chrominance signal which are delayed and then output from first and second line memories, respectively. Preferably, the outputs of the first and second line memories 26 and 28 recirculate the digital luminance signal and digital chrominance signal via switches 38 and 40, respectively, for subsequent delay and output again. Therefore, if the composite synchronizing signal CS output from sync separator 18 is abnormal, the digital luminance signal and the digital chrominance signal, which can collectively be referred to as video data, input to first and second field memories 30 and 32 do no correspond to the current horizontal line video data but to data delayed by 1 line.

If the horizontal synchronizing signal is normally inserted for each horizontal line of the video signal by the above-described operation, it is determined that the video data of the current horizontal line is valid and the video data is then supplied to first and second field memories 30 and 32. If the horizontal synchronizing signal is delayed for any reason by more than about 3 μsec and then input, it is determined that the current synchronizing signal is a noise signal and the video data corresponding to the previously reproduced horizontal line is output to first and second field memories 30 and 32. Therefore, noise resulting from any discrepancy in the horizontal synchronizing signals is eliminated.

As described above, controller 46 for performing compensation of the synchronizing signal by detecting errors of the composition synchronizing signal CS output from the sync separator 18 and for controlling the video data supplied to first and second field memories 30 and 32 by eliminating the video data associated with errors in the horizontal synchronizing signal, controls the writing and reading operations of field memories 30 and 32. The manner of controlling the writing and reading of the field memories in accordance a composite synchronizing signal CS is well understood by those of ordinary skill in the art so a detailed discussion can be omitted. In the present invention, by using the compensated composite synchronizing signal CCS generated by the circuit depicted in FIG. 2, the writing and reading operations are controlled so as to eliminate skew and noise.

The video data, which date corresponds to the luminance signal Yi and chrominance signal Ci and which are output from first and second field memories 30 and 32, respectively, are supplied to the input ports of first digital-to-analog converter (DAC) 42 and second DAC 44 connected to the respective output ports of the field memories. First and second DACs 42 and 44 convert the luminance signal and chrominance signal of the input digital data into analog signals to thereby output a luminance signal Yo and a color difference signal Co (R-Y, B-Y), respectively, to encoder 50.

Encoder 50 encodes the luminance signal Yo, color difference signal Co, and the sub-carrier signal SC in synchronization with an externally input pseudo composite synchronizing signal PCS to thereby output a composite video signal ACVSo. It will be noted that the externally input pseudo composite synchronizing signal PCS is output by from a synchronizing signal generator 48, which generates a composite synchronizing signal in a pseudo manner in response to the input of the external clock ECLK. It will also be noted by those of ordinary skill in the art that signal generator 48 can be assembled using a general-purpose circuit.

As described above, according to the present invention, in searching a video signal reproduced from a magnetic recording medium of a video recording/playback system, the skew due to a lost synchronizing signal can be prevented, thereby removing one source of deterioration in picture quality. It will also be appreciate that the present invention also operates to eliminate noise in the reproduced composite video signal.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A video signal processor for compensating for skew and eliminating noise, said video signal processor comprising:

synchronizing signal generating means for generating a pseudo horizontal signal responsive to a received clock signal;

controlling means initialized in a first logic state of a horizontal synchronizing signal, for counting a period associated with a second logic state of said horizontal synchronizing signal with respect to said clock signal to thereby generate a compensated horizontal synchronizing signal if the counted value exceeds a predetermined count value and to thereby output a compensation control signal having a duration of one horizontal period;

line memory and field memory means for storing and for delaying received video data in line and field units, respectively, for output;

video data compensating means operatively connected to said line and said field memory means for supplying the output of said line memory means to said field memory means and for recirculating the output of said line memory means in response to said compensation control signal; and output video signal generating means receiving said video data output from said field memory means for generating and supplying an analog video signal in synchronization with said generated pseudo horizontal synchronizing signal.

2. The video signal processor for compensating for skew and eliminating noise as claimed in claim 1, further comprising:

separating means receiving an analog composite video signal for producing the horizontal synchronizing signal and the video signal; and analog-to-digital converting means operatively connected to said separating means for converting the separated video signal into said video data.

3. The video signal processor for compensating for skew and eliminating noise as claimed in claim 2, wherein said controlling means comprises:

counting means initialized at said first logic state of said horizontal synchronizing signal for counting the input period of said second logic state of said horizontal synchronizing signal with respect to said clock signal to thereby produce counted data value;

decoding means receiving said counted data value for generating an error detection signal when said counted data value exceeds the predetermined value;

delaying means for delaying said error detection signal output from said decoding means to thereby generate a delayed error detection signal;

means for generating said compensated horizontal synchronizing signal by logically combining said horizontal synchronizing signal and said delayed error detection signal; and compensation control signal generating means, initialized at a respective first logic state responsive to said horizontal synchronizing signal, for generating the compensation control signal responsive to said delayed error detection signal.

4. The video signal processor for compensating for skew and eliminating noise as claimed in claim 1, wherein said controlling means comprises:

counting means initialized at said first logic state of said horizontal synchronizing signal for counting the input period of said second logic state of said horizontal synchronizing signal with respect to said clock signal to thereby produce counted data value;

decoding means receiving said counted data value for generating an error detection signal when said counted data value exceeds the predetermined value;

delay means for delaying said error detection signal output from said decoding means to thereby generate a delayed error detection signal;

means for generating said compensated horizontal synchronizing signal by logically combining said horizontal synchronizing signal and said delayed error detection signal; and compensation control signal generating means, initialized at a respective first logic state responsive to said horizontal synchronizing signal, for generating the compensation control signal responsive to said delayed error detection signal.

5. The video signal processor for compensating for skew and eliminating noise as claimed in claim 1, wherein said line memory means comprises first and second line memories, and wherein said video data compensating means comprises a plurality of switches operatively connected to said first and said second line memories, said switches being connected so as to provide said video data to said first and second line memories and to said field memory means simultaneously in a first operating state and connected so as to provide said video data stored in said first and second line memories to said field memory means while recirculating said video data to said first and second line memories in a second operating state.

6. A video signal processor for compensating for skew and eliminating noise, comprising:

separating means for separating a composite video signal into a first horizontal synchronizing signal and a video signal;

digitally converting means for converting said separated video signal into video data;

horizontal line delaying means for delaying said video data for output in terms of line units as delayed line video data;

field memory means for storing said line video data in response to a predetermined control signal and for delaying the stored video signal in terms of field units for output as delayed field video data;

synchronizing signal generating means receiving a clock signal for generating a second horizontal synchronizing signal;

controlling means initialized in a first logic state of said first horizontal synchronizing signal for counting a respective period of a second logic state in said first horizontal synchronizing signal with respect to said clock signal to thereby generate a compensated horizontal synchronizing signal when a resultant counted value exceeds a predetermined value and to thereby output a compensation control signal having a duration of one horizontal period;

video signal path converting means operatively connected said converting means to said horizontal line delaying means and said horizontal line delaying means to said field memory means, for supplying said video data to said horizontal line delaying means and field memory means, and for supplying said line video data to said field memory means and to said horizontal line delaying means in response to a switching control signal; and output video signal generating means receiving said field video data for generating an analog output video signal in synchronization with said second horizontal synchronizing signal.

* * * * *